United States Patent [19]

Taylor et al.

[11] Patent Number: 5,080,920
[45] Date of Patent: Jan. 14, 1992

[54] BLOOM RESISTANT COOKIES

[75] Inventors: James B. Taylor, Sparta; James M. Manns, Glenwood, both of N.J.; Peter S. Given, Jr., Glenco, Ill.; Donald M. Balthasar, Randolph, N.J.; Janet M. Page, Basking Ridge, N.J.; Frederick Vesper, Ridgewood, N.J.

[73] Assignee: Nabisco Brands, Inc., Parsippany, N.J.

[21] Appl. No.: 560,187

[22] Filed: Jul. 31, 1990

[51] Int. Cl.$^5$ .................. A21D 10/00; A23D 7/00
[52] U.S. Cl. .................. 426/549; 426/94; 426/275; 426/306; 426/613
[58] Field of Search .............. 426/549, 94, 275, 613, 426/553, 306

[56] References Cited

U.S. PATENT DOCUMENTS

| | | | |
|---|---|---|---|
| 3,307,953 | 3/1967 | Siebers | 426/613 |
| 4,234,618 | 11/1980 | Jasko et al. | 426/613 |
| 4,344,969 | 8/1982 | Youngquist et al. | 426/549 |
| 4,465,703 | 8/1984 | Jasko et al. | 426/613 |
| 4,664,921 | 5/1987 | Seiden | 426/613 |
| 4,668,522 | 5/1987 | Cappel et al. | 426/549 |
| 4,722,849 | 2/1988 | Dartey et al. | 426/549 |
| 4,752,484 | 6/1988 | Pflaumer et al. | 426/549 |
| 4,840,803 | 6/1989 | Polizzano | 426/549 |
| 4,873,098 | 10/1989 | Banks et al. | 426/549 |
| 4,894,246 | 1/1990 | Dartey et al. | 426/549 |

Primary Examiner—Donald E. Czaja
Assistant Examiner—Mary S. Mims

[57] ABSTRACT

Bloom resistant cookies containing cocoa powder and/or chocolate liquor as a flavoring are produced without lard using a vegetable fat or shortening having a solid fat content of about 2.3% to about 21.6% at 70° F. and about 0.2% to about 11.6% at 85° F. The preferred fats are partially hydrogenated soybean oil, partially hydrogenated cotton seed oil and mixtures thereof. The fats further have an oleic acid content of about 52% to 62% and a combined linolenic acid and gadoleic acid content of 1.2% or less. The cookies exhibit similar color, taste and texture to control samples made with lard without experiencing any fat bloom.

28 Claims, 2 Drawing Sheets

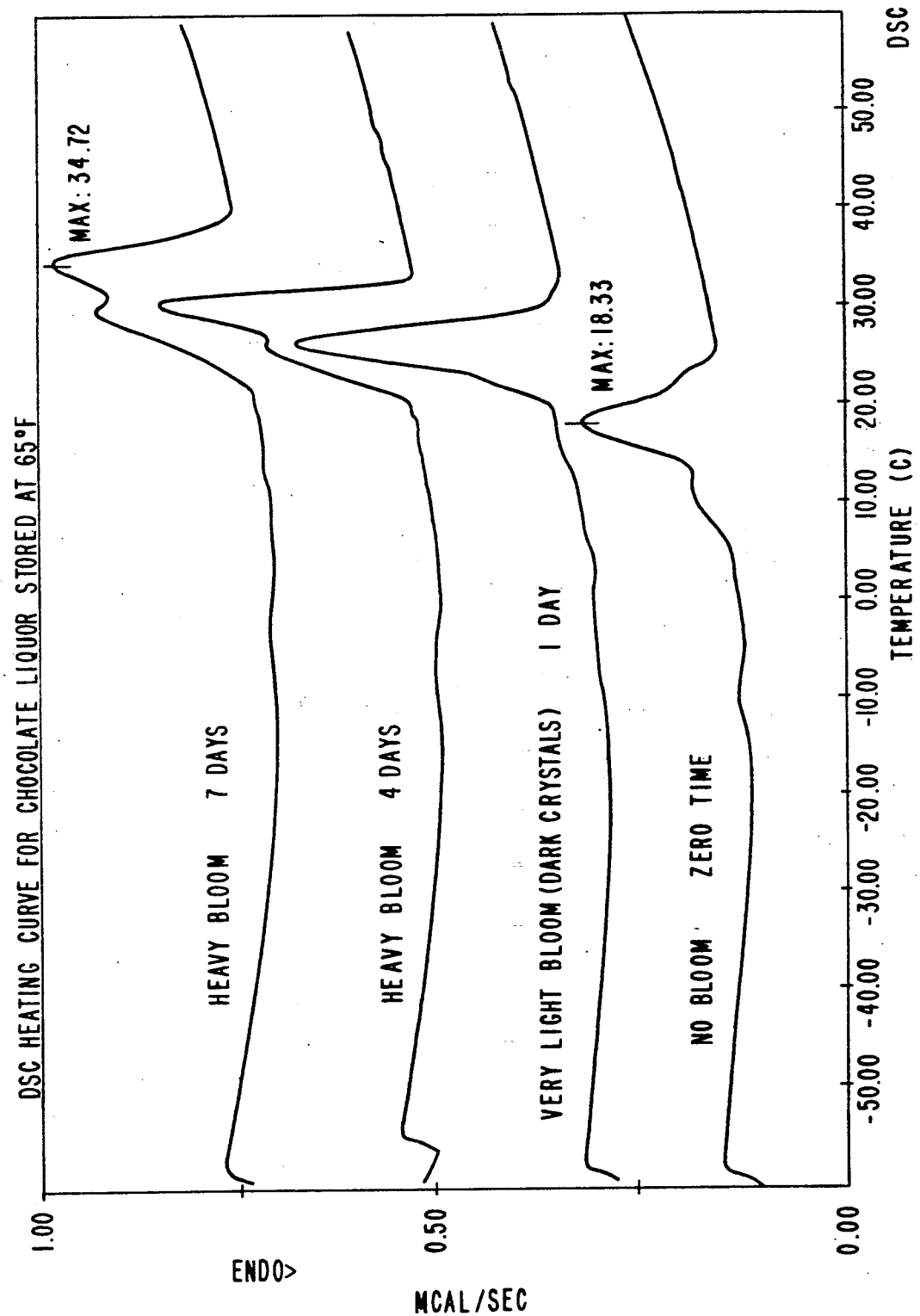

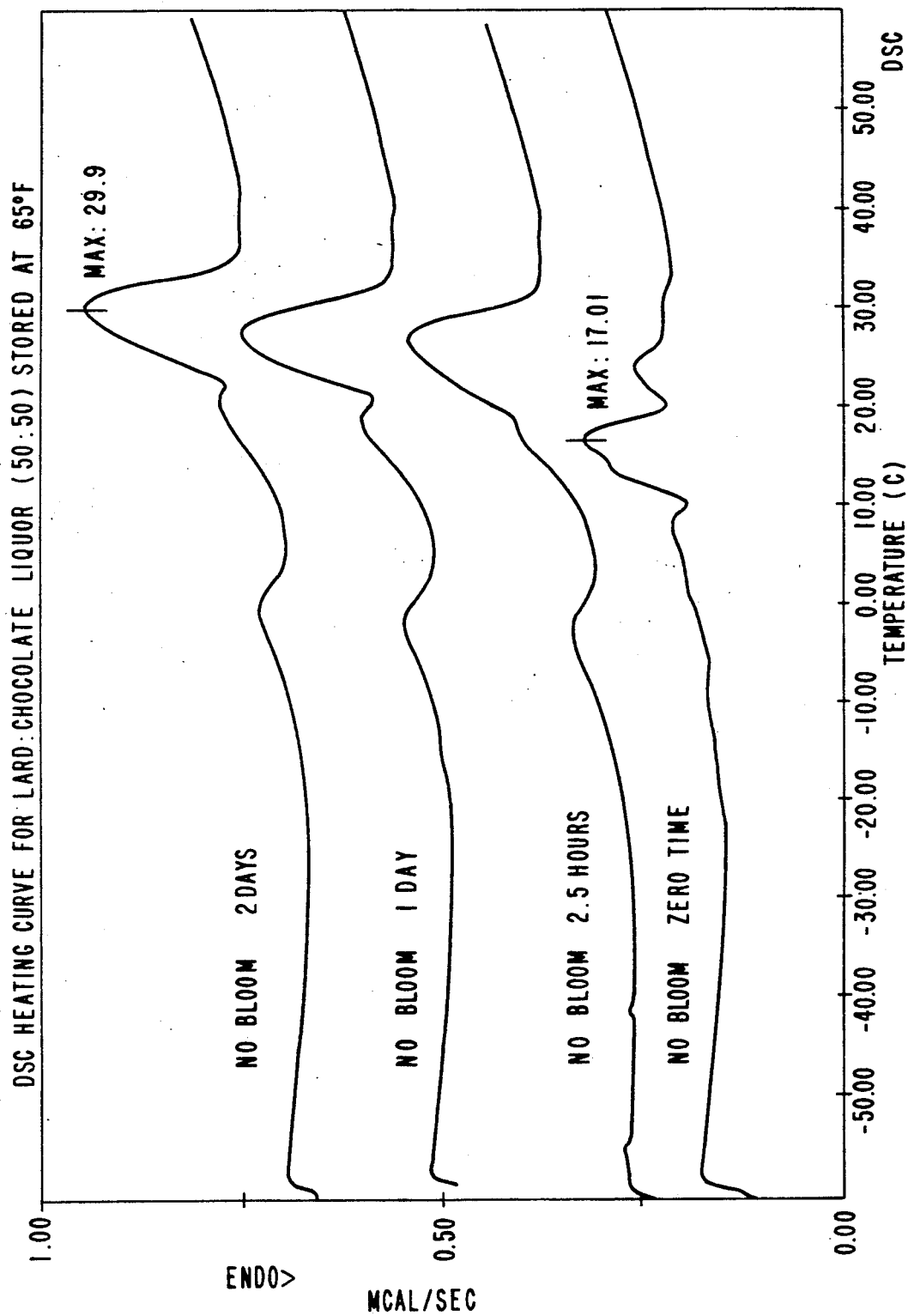

BLOOM RESISTANT COOKIES

FIELD OF THE INVENTION

The present invention relates to methods of producing cookies having resistance to bloom. More particularly the invention is directed to cookie compositions containing cocoa powder or chocolate liquor and to methods of producing the cookies which are similar in taste, color and texture to cookies containing lard.

BACKGROUND OF THE INVENTION

Cookies are typically made from flour, sugar, fat or shortening and a suitable flavoring component. Common flavorings may include chocolate, cocoa powder, chocolate liquor or chocolate flavor chips. The inclusion of these flavorings has the disadvantage of producing bloom on the surface of the cookie in some cookie formulations. The bloom on the cookies appears as a white haze or deposit on the surface of the cookie. The bloom may appear as discrete particles, although usually it appears as a continuous layer. The cookie, and particularly dark chocolate cookies, tend to loose their detail and color as a result of the bloom. Bloom may also be a serious problem in high moisture cookies and soft cookies where the bloom generally forms during cyclic temperature changes.

The bloom on the surface of the cookies is the result of the formation of fat crystals and is typically referred to as fat bloom. Bloom may occur in many fat systems, but is normally most noticeable in chocolate and cookies containing chocolate or cocoa powder and chocolate liquor. It is also believed that cookies of high moisture content are more susceptible to fat bloom than cookies with lower moisture. Fat bloom may also occur in chocolate chips or chocolate products where the chocolate has not been properly tempered or which has been subjected to sudden cooling. Bloom may also occur in chocolate cookies and chocolate chip cookies made with a high portion of liquid shortening.

In a typical cookie manufacturing process, after baking the cookies are cooled below ambient temperature to solidify fats and thus aid in packaging of the product. It is believed that during this cooling step, cocoa butter, a polymorphoric fat, in the product solidifies into an initial crystalline structure that has a melting point at or below ambient temperature (approximately 65° F.). Due to the formation of a eutectic with certain vegetable shortenings commonly used in cookies this melting temperature may even be further lowered. During storage, the cookie reaches ambient temperature which causes some of the cocoa butter to liquify. The liquified cocoa butter then migrates to the surface of the cookie where it recrystallizes to a more stable crystal form and produces bloom. Bloom does not create any health risks or significantly influence the taste or texture of the product. The appearance of white haze of fat bloom is, however, unappealing and tends to make the product appear stale and unappetizing. The bloom often makes the cookies appear scuffed, damaged or defective.

Fat bloom is particularly noticeable in dark chocolate or fudge cookies which are made from a mixture of flour, sugar, water, fat or shortening, cocoa powder and/or chocolate liquor. The flavor of cocoa powder is generally strong, depending on the processing, and is used in small amounts compared to the other ingredients. Cocoa powder, however, generally contains about 10% by weight cocoa butter. Although chocolate cookies contain fairly low amounts of cocoa butter, the cocoa butter tends to promote fat bloom. Cocoa butter is different from most other fats in that it undergoes polymorphism in at least three different distinct polymorphic crystalline forms which is believed to be a contributing cause of fat bloom. The different crystalline forms of cocoa butter have different energies and melting points. The most unstable crystalline forms have the highest energy and melt at lower temperatures. The lower melting point fraction of the coco butter is believed to liquify during storage and migrate to the surface of the cookies where it recrystallizes into a more stable crystal form.

Bloom may also occur in creme-filled sandwich cookies where the fat can migrate between the filler and the cookie base cake. Fat migration between the components can result in interaction of the ingredients to change the color, texture and taste of the cookies.

Chocolate and fudge cookies containing cocoa powder and/or chocolate liquor are particularly prone to bloom when most vegetable fats are used as the shortening in the cookie base cake. It is believed that the bloom may be caused by an interaction of the fat in the cookie and the cocoa butter which inhibits rapid crystallization of the cocoa butter. Lard, however, when used as the cookie shortening has been found to resist fat bloom in cookies which contain cocoa butter, except under extreme temperature changes. Lard does not exhibit polymorphic behavior and crystallizes quickly during cooling to a stable crystal form. It is believed that the lard, which has a relatively sharp melting point, causes the cocoa butter to crystallize rapidly on cooling. The rapid crystallization of the cocoa butter is believed to produce small crystals and prevent fat bloom. Lard further has a fairly linear solid fat content between 65° F. and 80° F. unlike most other vegetable fats. In addition to preventing fat bloom, lard produces a texture and distinct flavor which is difficult to duplicate using vegetable shortenings. In recent years, however, consumer acceptance of lard in baked goods has diminished, resulting in efforts to find a suitable substitute for lard. Many of the substitutes for lard are subject to fat bloom.

Efforts to prevent fat bloom in cookies include, for example, the methods disclosed in U.S. Pat. No. 4,894,246. A low melting fat having a solid fat index of less than 13 at 80° F. and which is liquid at about 100° F. is added to a cookie dough containing chocolate chips. The low melting fat is added in an amount such that it comprises about 5% to 30% of the fat in the cookie. The low melting fat is reported to reduce the effects of fat bloom of the chocolate chips and the halo effect of bloom on the cookie around the chips.

The previous methods of reducing fat bloom on cookies are concerned primarily with the bloom from chocolate chips. These methods are not suitable for preventing bloom of dark cookies containing cocoa power or chocolate liquor where the cocoa butter is intimately mixed throughout the cookie. In addition, these methods are not able to duplicate the taste and texture of lard in cookies. There is accordingly a need for a suitable lard replacement in cookies containing cocoa butter in the form of cocoa powder or chocolate liquor.

The present invention provides a shelf-stable cookie which is resistant to fat bloom over extended times. The cookies are produced from partially hydrogenated soybean oil and/or cotton seed oil which are able to substantially duplicate the flavor and texture of chocolate or fudge cookies made from lard.

SUMMARY OF THE INVENTION

The present invention is directed to shelf-stable, bloom-resistant cookies and to methods of producing the cookies. The process comprises mixing flour, sugar or sweetener, a flavorant of chocolate, cocoa powder and/or chocolate liquor and a fat or shortening. The fat or shortening in a preferred embodiment is partially hydrogenated soybean oil, cotton seed oil or mixtures thereof and has a solid fat content of about 2.3% by weight solids to about 21.6% by weight solids at 70° F. and further has a solid fat content of about 0.2% to 11.6% by weight solids at 85° F. The fat or shortening further has an oleic (18:1) fatty acid content of about 52% to about 62% by weight. The combined linolenic (18:3) and gadoleic (20:1) acid content is about 1.2% or less. In the preferred embodiment the fat has a solid fat content of about 2.3% to 6.0% by weight at 70° F. and about 0.2% to 3.0% by weight at 85° F. based on the weight of the fat. Preferably the fat or shortening has a combined linolenic acid and gadoleic acid content of less than 1.0% by weight of the fat or shortening.

The cookies prepared according to the invention generally have a cocoa powder content of up to about 20% and preferably about 5% to 15% by weight. The cookies may further have a chocolate liquor content of about 0.5% to about 2.0% by weight based on the total weight of the cookie formulation. The cookie base cake preferably has a cocoa butter content of about 0.5% to 3.0% by weight excluding the cocoa butter contained in any optional chocolate chips. The partially hydrogenated soybean and cotton seed shortenings of the invention result in a cookie which is resistant to the fat bloom typically caused by the cocoa butter in the cocoa powder or chocolate liquor used as a flavorant. Cookies prepared in accordance with the invention have a taste and texture substantially similar to cookies prepared using lard.

The cookies prepared according to the invention may also be creme filled sandwich cookies comprising crisp base cakes. The sandwich cookies retain a crisp textured base cake over extended periods of time, do not exhibit fat bloom or substantial yellowing or discoloration of the cookie creme filling and no grittiness in the creme filling. The cookies of the present invention are texturally and microbially shelf stable for at least two months, preferably at least six months when packaged in closed containers.

BRIEF DESCRIPTION OF THE DRAWINGS

The invention is described in conjunction with the drawings of which the following is a brief description.

FIG. 1 is a DSC heating curve for chocolate liquor stored at 65° F.

FIG. 2 is a DSC heating curve for a lard and chocolate liquor mixture stored at 65° F.

DETAILED DESCRIPTION OF THE INVENTION

The present invention is directed to a bloom resistant shelf-stable cookie containing cocoa powder and/or chocolate liquor as a flavorant. More specifically, the invention relates to chocolate or fudge type cookies which do not contain lard and are at parity with cookies containing lard in bloom resistance, color, texture and taste. The cookies prepared in accordance with the invention may be firm, crisp cookies, soft and chewy cookies, creme-filled sandwich cookies and cookies containing chocolate chips or other flavor chips.

In the past, cookies which include a source of cocoa butter, such as cocoa powder, chocolate liquor and chocolate, have been made with lard to provide the desirable taste and texture to the cookie. In addition, lard has been used favorably to prevent bloom in dark chocolate cookies. In chocolate or fudge-type cookies the cocoa powder and chocolate liquor are intimately mixed with shortening and other cookie ingredients such that the cocoa butter in the cocoa powder and chocolate is in contact with the shortening. It has been found that the lard mixes with the cocoa butter to form fat crystals with a melting point of about 82° F. that are stable under typical storage conditions. It is further believed that the cocoa butter stabilization by lard is related to the level of fat solids at storage temperatures and of the triglyceride composition of the lard. The solid fat content and triglyceride composition of lard is complementary to the fat solid content and triglyceride composition of cocoa butter to allow for the development of stable crystals in the cookie base cake. The stable crystal form does not undergo significant polymorphism. It is believed that the fat or shortening of the invention result in the development of a stable crystal form with the cocoa butter, which reduces the amount of liquid cocoa butter formed during storage. The liquid portion of cocoa butter in conventional cookie production is believed to migrate to the surface of the cookie and recrystallize as fat bloom.

In the present invention the cookies are prepared from a mixture of flour, sugar, a flavorant containing cocoa butter, and a fat or shortening having a solid fat content of about 2.3% to about 21.6% by weight at about 70° F. and about 0.2% to about 11.6% by weight at about 85° F. The fat or shortening further has an oleic acid (18:1) content of about 52% to about 62% and a combined linolenic (18:3) and gadoleic acid (20:1) content of about 1.2% or less. The small amount of the polyunsaturated fats promotes the formation of a stable cookie and a shelf stable flavor. The fat preferably has a free fatty acid content of 0.05% or less and a peroxide value of 1.0 or less. In addition, the fat preferably has a solid fat content of about 0.8% to about 18.8% by weight at about 75° F. and about 0.5% to 15.3% by weight at about 80° F. In the preferred embodiment of the invention, the fat has a solid fat content of about 2.3% to 6.0% by weight at 70° F. and about 0.2% to 3.0% by weight at 85° F. The combined linolenic acid and gadoleic acid content in the preferred embodiment is 1.0% by weight or less.

The fats in the preferred embodiment of the invention are at least partially hydrogenated fats, and therefore the amount of linolenic acid in the fats is generally quite low, generally less than 1.2% and preferably less than 1% by weight, since the polyunsaturated fats are reactive and hydrogenate easily. The measurement of the linolenic acid will generally include the measurement of the amount of gadoleic acid in the fat, since the technique for identifying the different fatty acids is unable to differentiate between linolenic acid and gadoleic acid. The fatty acid content is thus recorded as 18:3+20:1 since linolenic and gadoleic acid are both generally present in the fat or shortening.

In the preferred embodiment of the invention, the fat is a partially hydrogenated soybean oil, partially hydrogenated cotton seed oil or mixtures thereof which satisfy the above solid fat content and fatty acid content. These fats having the solid fat content and fatty acid composition are able to produce cookies which are resistent to fat bloom and have a color, taste and texture substantially the same as lard. The resistance of a fat to bloom, its taste and texture of the cookie are believed to be primarily dependent on the solid fat content of fat between about 65° F. and about 90° F., since these are the temperature ranges which the cookies encounter during storage. In addition, the desirable shortening characteristics of the fat are dependent on the solids content between 65° F. and about 90° F. which contributes to the texture and taste of the cookie.

Cocoa butter is generally present in the cookie formulation in the amount of at least about 0.5% by weight and preferably about 1.0% to about 3.0% by weight based on the total dry weight of the cookie formulation without any added water. The cocoa butter is generally present in the cookie from chocolate, cocoa powder, chocolate liquor and mixtures thereof which are added as a flavorant. The cocoa powder, as a source of cocoa butter, is preferably a dutched cocoa produced by treating the roasted cocoa powder with alkali. Cocoa powder generally contains about 10% cocoa butter. The cocoa powder is generally present in the cookie composition in the amount of about 5% by weight to about 20% by weight. In the preferred embodiment, the cocoa powder is included in the amount of about 5% by weight to about 15% by weight based on the total weight of the cookie composition. Chocolate liquor is typically about 50% cocoa butter and is included in the cookie composition in the amount of about 0.5% to about 2.0% by weight and preferably about 1.0% to 1.5% by weight.

The solid fat content of the fats in the preferred embodiment are determined at about 65° F. and about 90° since this is the typical temperature range generally experienced during storage of the finished cookie. The solid fat content is preferably determined by pulsed, low resolution NMR spectroscopy and is defined as "solid fat content" rather than "solid fat index". The fat is preferably tempered, solidified at a predetermined temperature, and then placed into the spectrometer. Within a few seconds the spectrometer determines the ratio of solid and liquid portions by detecting the amount of protons in each phase. This method is believed to provide a more accurate determination of the amount of solid fats compared to the indirect Solid Fat Index which relates the percentage solids to the density difference of the liquid and solid phases of the fat. The solid fat content as measured by pulsed NMR spectrometry can not, however, distinguish between the linolenic acid and gadoleic acid content of the fat. The signals generated and recorded by the spectrometer are low resolution and thus not converted by Fourier transformation to the frequency domain as is the case for high resolution NMR spectrometers where the various chemical moieties in a compound are resolved. In the preferred embodiment, the Solid Fat Content is determined using a Bruker Minispec PC20 by Method 2.150 (ex 2.323) of Standard Methods for the Analysis of Fats, Oils and Derivatives (1987).

The fats in the preferred embodiment have a solid fat content of about 2.3% to 21.6% at 70° F. and about 0.2% to 11.6% at 85° F. Fats satisfying the solid fat content have a sufficient solid level to interact with the cocoa butter to form composite crystals which exhibit a shortening functionality similar to lard. The proper shortening action of the fats is necessary to provide the cookie crumb structure, texture and flavor. Within the class of fats defined by this solid fat content are fats that due to their triglyceride structure will form stable crystals with cocoa butter and thus form crystals that do not undergo significant polymorphism. Polymorphism is believed to be a major cause of bloom. Fats of the proper triglyceride structure are identified by an oleic acid content of about 52% to about 64% and a combined linolenic and gadoleic acid content of about 1.2% or less, preferably 1.0% or less.

The fat or shortening having the required solid fat content is included in the cookie in the amount of about 8% to about 50% by weight based on the total weight of the cookie formulation. Preferably, the fat or shortening is included in the amount of about 10% to about 30% by weight and most preferably about 10% to 15% by weight.

The cookie dough composition may contain from about 30% to about 70% by weight flour, preferably from about 45% to about 55% by weight. The flour is preferably wheat flour although any edible seed or grain meal may be used. Exemplary flours which may be used include corn flour, oat flour, barley flour, rye flour, rice flour, potato flour, grain sorghum flour, corn starch, physically and/or chemically modified flours or starches and mixtures thereof. The flour may be bleached or unbleached flour as desired. The flour component may be replaced in part with flour substitutes or bulking agents such as for example, polydextrose, hollocellulose, microcrystalline cellulose, corn bran, oat bran, rice bran and mixtures thereof.

At least one sugar is included in the cookie composition to provide a suitable level of sweetness and modify the texture of the cookie. Compatible sugars may include, for example, sucrose, fructose, lactose, dextrose, galactose, maltodextrins, corn syrup solids, hydrogenated starch hydrolysates, protein hydrolysates and mixtures thereof. In the preferred embodiment of the invention the sugar is in either solid or crystalline form such as granulated sucrose, granulated brown sugar or granulated fructose. The sugar may be replaced in whole or in part with a non-nutritive sweetener, such as for example, aspartame, saccharine, and cyclamates.

In embodiments of the invention the sugar content is generally between about 10% by weight to about 50% by weight based on the total weight of the cookie dough. In preferred embodiments, the sugar content is between about 20% by weight to about 30% by weight. Non-nutritive sweeteners may be included in the amount of about 0.01% to about 1.0% by weight.

Humectant sugars may also be employed to provide a soft texture to the resulting cookie. The humectant sugars may be used alone or in combination with other sugars. Suitable humectant sugars may include, for example, invert syrups, corn syrups, high fructose corn syrup, honey, molasses, liquid brown sugar and the like.

The preferred humectant sugars are high fructose corn syrups, since these syrups are readily available, low in cost and provide a pleasant sweet taste. The sugar solids content of most high fructose corn syrups generally range from about 70% to about 83% by weight. High fructose corn syrups having at least about 80% by weight solids are preferred. Other humectants may include glycerols, mannitol, maltitol, xylitol, and sorbitol.

The moisture content of the cookie dough before baking is generally about 5% to about 20% by weight to provide proper consistency for forming and shaping. The total moisture content of the dough will include any water present in the flour, sugar, and syrups, as well as added water. Preferably the total moisture content of the dough will be about 5% to about 10% by weight based on the total weight of the cookie dough composition. After baking, the cookie will generally have a moisture content of about 1% to about 10% by weight and preferably about 4% to about 6% by weight.

Emulsifiers may be included to disperse the components in the fat or shortening. Exemplary emulsifiers include lecithin, sorbitan monostearate, mono- and/or diglycerides, polyoxyethylene sorbitan fatty acid esters, such as polysorbates, and sodium stearoyl-2-lactate. The emulsifiers may be included up to about 4% by weight based on the weight of the flour.

In addition to the foregoing, the cookie doughs used in the present invention may include other additives typically used in cookies. Such additives may include, for example, milk by-products, egg or egg by-products, vanilla and other flavorings. The cookie dough may also include nuts, raisins, coconut, chocolate chips, butterscotch chips, caramel chips and the like in the amount of, for example, 5% to 30% by weight, preferably 10% to 20% by weight.

The cookie dough composition of the invention further contains up to about 5% by weight of a leavening agent which may also serve as a pH adjusting agent to effect the flavor and browning of the cookie. Exemplary chemical leavening agents or pH adjusting agents which may be used include sodium bicarbonate, ammonium bicarbonate, sodium acid pyrophosphate, tartaric acid and mixtures thereof. The leavening agent may alternatively be a yeast or bacteria.

The cookie doughs of the present invention are prepared using a creaming stage and a dough-forming stage. The sugar, fat or shortening and source of cocoa butter are first creamed together. The flour, leavening agent and any added water are then added to the creamed mixture and blended to form a cookie dough. The dough is then shaped into cookie dough pieces by a wire cutter, by sheeting and rotary molding or by other methods known in the art. The dough pieces are then baked according to conventional practices to a moisture content of about 6% or less, preferably about 4% by weight based on the total weight of the cookie.

The cookie products produced in accordance with the invention may be used to prepare sandwich cookies containing a creme filling of sugar and a shortening. The sandwich cookies are prepared using at least two cookies contain the creme filling between the cookies. The cookie may further be provided with an icing or coating of a confectionery or chocolate coating. Suitable confectionery coatings include chocolate-flavored or vanilla hard butter compound coatings. The commercially available chocolate flavored hard butter compound coatings generally include cocoa powder, chocolate liquor, sugar and an emusifier in a partially hydrogenated and/or interesterified vegetable shortening. The coated or enrobed cookies of the present invention do not exhibit fat bloom in the chocolate or confectionery coating over extended periods of time.

The cookies prepared in accordance with the present invention have exhibited a flavor and texture substantially equivalent to cookies prepared with lard. In addition, the cookies containing a source of cocoa butter do not exhibit fat bloom during storage. Textural and microbial stability of the cookies is at least two months, preferably at least 6 months when the cookies are stored in closed packages.

The fats in accordance with the invention are selected to have a solid fat content substantially the same as lard. The fats have a solid fat content of about 2.3% to about 21.6% by weight, preferably about 2.3% to 6.0% by weight at 70° F. and about 0.2% to 11.6% by weight, preferably 0.2% to 3.0% by weight at 85° F. This temperature range was selected to establish the solid fat content since these are the typical temperatures which the cookies encounter during storage. The solid fat content of the fat is usually rather linear between 70° F. and 85° F. Lard, for example, varies almost linearly decreasing from about 21% solids at 65° F. to about 10% solids at 85° F. The solid fat content alone has been found to be inconclusive of a suitable replacement for lard in cookies containing cocoa butter in terms of taste, texture, color and fat bloom. It has been found that the amount of oleic acid, linolenic acid and gadoleic acids is important in contributing to the resistance of the cocoa butter to bloom and to the attainment of the desired color, taste and texture of the cookie.

The fats were examined by Differential Scanning Calorimeter methods (DSC) as well known in the art. DSC profiles essentially plot the melting profile of a fat system by plotting the energy adsorption against the temperature of the test sample. The profile appears as one or more peaks which are indicative of the number of crystal structures of the fat. The peaks appear at the melting point of the different crystals in the fat system. Changes in the peaks of subsequent DSC profiles are indicative of changes in crystal structure of the fat and the unstable nature of the fat.

An additional characteristic in selecting a suitable shortening is the potential for interaction of the fat in the cookie with the fat from a confection used as a creme filler in sandwich cookies or which is used to enrobe the cookie. It has been found that some fats migrate between the cookie base cake and the filler or enrobing which may make the filler gritty or change texture and color of the filler. It has been found that sandwich cookies prepared in accordance with the invention do not exhibit grittiness in the filler after storage. The filler has, in addition, softened during storage to result in a pleasant tasting creme filler.

The occurrence of fat bloom on the surface of the cookie base cake appears as a white, dull haze. Small changes in bloom can be measured using a tristimulus colorimeter which measures four specific wavelengths in the visible range. The tristimulus values give a 3-dimensional value for the color to enable objective comparison between samples. The color readings are translated into L, a and b coordinates that correlate with color as perceived by the human eye. The L values represent light and dark from a value of 0 (black) to 100 (white). The "a" value represents the green - red spectrum from −60 (green) to +60 (red). The "b" value represents the blue - yellow spectrum from −60 (blue) to +60 (yellow). The colorimeter is able to detect small changes in the color of the cookie base cake which demonstrate the formation of fat bloom. The L value is considered the most valuable in detecting and measuring fat bloom. One example of a suitable colorimeter is a Minolta Chroma Meter CR-210.

EXAMPLE I

This example demonstrates the inherent instability of cocoa butter and the tendency of cocoa butter to bloom compared with the stabilizing effect of lard blended with cocoa butter. Several samples of chocolate liquor containing about 50% by weight cocoa butter were heated and cooled under typical baking conditions and then stored uncovered at 65° F. in DSC pans. Similar samples were prepared from a 50:50 mixture of lard and chocolate liquor and subjected to the same heating and cooling conditions. The lard and chocolate liquor samples were stored in uncovered DSC pans at 65° F. The evidence of bloom was established visually by observing the formation of white crystals on the surface of chocolate liquor. DSC melt profiles were prepared for the samples initially after cooling and at days 1, 4, and 7. The DSC profiles were prepared by heating at 10° C. per minute in a DSC calorimeter. The melt profiles are recorded in FIG. 1. As shown, the cocoa butter in the chocolate liquor sample initially solidified as a low melting crystal having a melting point of about 18.3° C. No bloom was initially visible. After one day of storage at 65° F., a light bloom was visible on the surface of the cocoa butter, and after four days a heavy bloom appeared. The DSC melt profiles made after 1 day, 4 days and 7 days show a rapid polymorphism resulting in heavy bloom development and the development of a more stable crystal form. The cocoa butter stabilized in about 4 days.

DSC melt profiles of the chocolate liquor and lard mixture made initially, after 2.5 hours, one day and two days are shown in FIG. 2, and demonstrate a rapid formation of a stable crystal composite melting at about 29.9° C. This crystal formation did not significantly change over time. The samples after two days showed no visible indications of bloom.

EXAMPLE 2

This example compares the occurrence of fat bloom, taste, color and texture of different samples of chocolate cookie base cakes made with different fats. Several samples of cookie base cakes were prepared from the following ingredients:

| Ingredients | Amount |
| --- | --- |
| Flour | 534 g |
| Sugar | 267 g |
| Fat or Shortening | 121 g |
| Cocoa powder, Chocolate Liquor | 110 g |
| Water | 108 g |
| Leavening | 4.0 g |
| Salt, Lecithin, flavoring | 21.0 g |

The cookie doughs were prepared by creaming the sugar with the fat, cocoa powder, chocolate liquor, flavoring, salt and lecithin. The leavening and water were then mixed. On a calculated basis, the cocoa butter content of the dough was about 1.4% by weight, based upon the weight of the dough on a dry basis. The flour was then blended to form a dough. The dough was shaped into cookie dough pieces by rotary molding and baked in a multistage continuous oven.

A control sample was prepared as above using lard. Comparative test samples were similarly prepared using partially hydrogenated soybean oil, partially hydrogenated cotton seed oil and cotton seed/soybean blends. The type of fat and the solid fat content of the fat of each sample base cake are shown in Table I. The solid fat content of the fats was determined by pulse low resolution NMR spectroscopy.

After baking the cookie samples were compared with the lard control for color, texture and appearances. The cookie samples were placed in mason jars and stored at a constant temperature of 65° F. This temperature was selected since it has been found to accelerate fat bloom. The cookie samples were visually examined for the development of fat bloom for about 6 months. The taste, color, texture and bloom effects of the fats are reported in Table I.

TABLE 1

| Sample | Oil Type | 70° F. | 85° F. | Parity with Lard Cookie | Characteristic |
| --- | --- | --- | --- | --- | --- |
| Control | Lard | 20.0 | 10.0 | — | No Bloom |
| 1 | Hydro cot | 44.5 | 26.1 | No | No Bloom, lighter color |
| 2 | Hydro Soy | 28.3 | 16.8 | No | Bloomed |
| 3 | Hydro Soy/cot | 26.7 | 15.2 | No | Bloomed |
| 4 | Hydro Soy | 22.3 | 18.5 | No | Different color, no bloom |
| 5 | Hydro Soy/cot | 22.3 | 11.4 | No | Lighter color, no bloom |
| 6 | Hydro Soy/cot | 19.0 | 15.5 | No | Bloomed |
| 7 | Hydro Soy/cot | 16.3 | 13.0 | No | Bloomed |
| 8 | Hydro Soy | 16.3 | 12.5 | No | Bloomed |
| 9 | Liquid Soy/cot | 0 | 0 | No - | Unacceptable cookie, no leavening |
| 10 | Hydro Soy | 14.7 | 6.5 | No | Bloomed |
| 11 | Hydro Soy/cot | 15.2 | 4.9 | No | Bloomed |
| 12 | Hydro Soy/cot | 13.6 | 10.3 | No | Bloomed |
| 13 | Hydro Soy | 16.3 | 8.1 | No | Bloomed |
| 14 | Hydro Soy/cot | 20.6 | 11.4 | No | Bloomed |
| 15 | Hydro Soy | 9.8 | 2.2 | No | Bloomed |
| 16 | Hydro Soy | 14.1 | 11.4 | Yes | No Bloom |
| 17 | Hydro Cot | 19.0 | 9.8 | Yes | No Bloom |
| 18 | Hydro Soy/cot | 15.2 | 7.1 | Yes | No Bloom |
| 19 | Hydro Cot | 19.5 | 9.2 | Yes | No Bloom |
| 20 | Hydro Soy | 2.3 | 0.4 | Yes | No Bloom |
| 21 | Hydro Soy/cot | 21.2 | 9.8 | Yes | No Bloom |

Samples 1 through 9 as shown in Table I demonstrate that oils outside the solids criterion of about 2.3% to about 21.6% at 70° F. and about 0.2% to about 11.6% at 85° F. do not yield a cookie product at parity with a cookie made with lard. In the majority of the oils the loss in parity is due to fat bloom on the surface of the cookie base cake. The control sample made with lard did not exhibit any fat bloom. The results further show that there are oils that will not cause fat bloom but are still not at parity with lard based cookies due to color or textural differences from the control.

Samples 10 through 15 as shown in Table I demonstrate that the solid fat content of the fat is not unique in characterizing a fat at parity with lard with respect to bloom resistance. Each of the samples 10 through 15 satisfied the solid fat content of 2.3% to 21.6% at 70° F. and 0.2% to 11.6% at 85° F. but exhibited fat bloom on the surface of the cookie. The samples 16 through 21 satisfied the same solid fat content profile but exhibited no fat bloom.

The fatty acid content of the samples 10 through 21 is shown in Table II as determined by gas chromatography by the method as disclosed in "Capillary Gas Chromatography" Athnasis et al., *Journal of the Association of Official Analytical Chemists*, Vol. 69, No. 1 pg. 65–67 (1986). The data of Table II demonstrate that samples having an Oleic acid (18:1) content of the fat within the range of 52% to 62% by weight of the fat and a linolenic acid (18:3) plus gadoleic acid (20:1) content of 1.2% by weight of the fat or less are at parity with lard. It is believed that the triglyceride structure of the fat as determined by the oleic acid, linolenic acid and gadoleic acid content form a stable composition with the cocoa butter in the cookie.

TABLE II

| Sample | 14:0 | 16:0 | 16:1 | 18:0 | 18:1 | 18:2 | 20:0 | 18:3 + 20:1 | 22:0 |
|---|---|---|---|---|---|---|---|---|---|
| 10 | ND | 10.8 | ND | 7.9 | 60.4 | 18.6 | 0.4 | 1.9 | ND |
| 11 | ND | 13.6 | ND | 6.3 | 64.0 | 14.3 | 0.5 | ND | 0.6 |
| 12 | ND | 11.9 | ND | 10.8 | 65.3 | 12.0 | ND | ND | ND |
| 13 | 0.1 | 11.7 | ND | 9.0 | 70.4 | 8.8 | ND | ND | ND |
| 14 | 0.1 | 12.3 | ND | 6.5 | 72.6 | 7.7 | 0.4 | ND | 0.4 |
| 15 | ND | 11.1 | ND | 5.0 | 74.0 | 9.6 | 0.3 | ND | ND |
| 16 | 0.1 | 13.1 | ND | 11.7 | 52.6 | 21.1 | 0.3 | 1.1 | ND |
| 17 | 0.8 | 22.5 | 0.4 | 7.3 | 57.9 | 10.8 | ND | 0.3 | ND |
| 18 | 0.9 | 24.3 | 0.5 | 5.3 | 60.4 | 8.3 | 0.3 | ND | ND |
| 19 | 1.0 | 25.0 | 0.5 | 3.8 | 60.6 | 8.5 | ND | ND | ND |
| 20 | ND | 11.0 | ND | 4.8 | 61.0 | 21.9 | 0.3 | 0.5 | 0.4 |
| 21 | 0.6 | 19.8 | 0.3 | 8.2 | 61.6 | 9.2 | 0.3 | ND | ND |

ND = not detected

What is claimed is:

1. A process of producing a shelf-stable cookie and inhibiting fat bloom comprising;
   (a) mixing flour, sugar, vegetable fat or shortening and flavoring to form a cookie dough, wherein the cookie dough contains at least about 0.5% by weight cocoa butter and wherein the fat or shortening has a solid fat content of about 2.3% to about 21.6% by weight at about 70° F., a solid fat content of about o.2% to about 11.6% by weight at about 85° F. and an oleic fatty acid content of about 52% to 62% by weight of the fat o shortening;
   (b) forming the cookie dough into discrete cookie dough pieces and baking the dough pieces to form a cookie,
   wherein the cookie is resistant to fat bloom and is shelf-stable.

2. The process of claim 1 wherein the fat or shortening is included in the amount of about 8% to about 50% by weight of the cookie dough.

3. The process of claim 1 wherein the fat or shortening is a partially hydrogenated fat or shortening selected from the group consisting of soybean oil, cotton seed oil and mixtures thereof.

4. The process of claim 1 wherein the cookie dough includes about 1.0% to about 3.0% by weight cocoa butter.

5. The process of claim 1 wherein the cookie dough includes about 0.5% to about 20.0% by weight cocoa powder.

6. The process of claim 1 wherein the cookie dough contains about 0.5% to about 2.0% by weight chocolate liquor.

7. The process of claim 1 wherein the cookie dough contains about 10% to about 50% by weight sugar.

8. The process of claim 1 wherein the baked cookie contains about 4% to about 6% moisture.

9. The process of claim 1 wherein the fat has a solid fat content of about 2.3% to about 6.0% by weight at 70° F. and about 0.2% to 3.0% by weight at about 85° F.

10. The process of claim 1 wherein the fat has a combined linolenic acid and gadoleic acid content of 1.2% by weight or less based on the weight of the fat.

11. The process of claim 10 wherein said combined linolenic acid and gadoleic acid content is 1.0% by weight or less based on the weight of the fat or shortening.

12. The process of claim 1 further including the step of coating the cookie with a coating composition selected from the group consisting of chocolate and hard butter confectionery coating compositions.

13. The process of claim 1 further including the step of sandwiching at least two of said cookies with a confectionery creme filling.

14. A shelf-stable bloom-resistant chocolate flavored cookie comprising flour, sugar, at least one flavoring as a source of cocoa butter selected from the group consisting of chocolate, cocoa powder, chocolate liquor and mixtures thereof, at least one fat or shortening, wherein the fat or shortening has a solid fat content of about 2.3% to about 21.6% by weight at about 70° F. and about 0.2% to about 11.6% by weight at about 85° F., said tat further having a oleic acid content of about 52% by weight to about 62% by weight.

15. The cookie of claim 14 wherein the fat or shortening is included in the amount of about 10% to about 50% by weight of the cookie.

16. The cookie of claim 14 wherein the cookie includes about 0.5% to about 3.0% by weight cocoa butter.

17. The cookie of claim 14 wherein the cookie includes about 0.5% to about 20% by weight cocoa powder.

18. The cookie of claim 14 wherein the cookie contains about 0.5% to about 2.0% by weight chocolate liquor.

19. The cookie of claim 14 wherein the cookie contains about 10% to about 50% by weight sugar.

20. The cookie of claim 14 wherein the cookie has a moisture content of about 4% to about 6% by weight.

21. The cookie of claim 14 wherein said cookie is a sandwich cookie having a creme filling of a fat and sugar between two cookie base cakes.

22. The cookie of claim 14 wherein said cookie includes a coating of a confectionery coating.

23. The cookie of claim 22 wherein said confectionery coating is chocolate or a hard butter confectionery composition containing cocoa powder and chocolate liquor.

24. The cookie of claim 14 wherein said fat or shortening has a combined linolenic acid and gadoleic acid content of 1.2% by weight or less based on the weight of fat or shortening.

25. The cookie of claim 14 wherein said fat or shortening has a combined linolenic acid and gadoleic acid content of 1.0% by weight or less based on the weight of the fat or shortening.

26. The cookie of claim 14 wherein said fat or shortening is selected from the group consisting of paritally hydrogenated soybean oil, partially hydrogenated cotton seed oil and mixtures thereof.

27. A process of preparing a shelf-stable chocolate cookie comprising:
   (a) forming a cookie dough comprising flour, sugar, fat or shortening and a flavorant, wherein the fat or shortening is selected from the group consisting of partially hydrogenated soybean oil, partially hydrogenated cotton seed oil and mixtures thereof, said fat or shortening having a solid fat content of about 2.3% by weight to about 6.0% by weight at about 70° F. and about 0.2% to about 3.0% by weight at about 85° F., and a oleic fatty acid content of about 52% to about 62% by weight, and wherein said flavorant is selected from the group consisting of cocoa powder, chocolate and chocolate liquor,
   (b) forming the cookie dough into pieces and baking the pieces to form a cookie, wherein the cookie is resistant to fat bloom and is shelf-stable.

28. The process of claim 27 wherein said fat or shortening has a combined linolenic acid and gadoleic acid content of 1.2% by weight or less.

* * * * *